United States Patent
Galavis

(10) Patent No.: US 9,006,550 B2
(45) Date of Patent: Apr. 14, 2015

(54) I CAN TEACH MUSIC

(71) Applicant: Arelis Josefina Galavis, Ottawa (CA)

(72) Inventor: Arelis Josefina Galavis, Ottawa (CA)

(73) Assignee: Arelis Josefina Galavis, Ottawa, Ontario (CA)

( * ) Notice: Subject to any disclaimer, the term of this patent is extended or adjusted under 35 U.S.C. 154(b) by 0 days.

(21) Appl. No.: 14/014,482

(22) Filed: Aug. 30, 2013

(65) Prior Publication Data
US 2014/0069260 A1   Mar. 13, 2014

Related U.S. Application Data

(60) Provisional application No. 61/699,742, filed on Sep. 11, 2012.

(30) Foreign Application Priority Data

Sep. 6, 2012  (CA) .................................... 2789422

(51) Int. Cl.
G09B 15/00  (2006.01)
G09B 15/04  (2006.01)
G09B 15/08  (2006.01)

(52) U.S. Cl.
CPC ............. *G09B 15/00* (2013.01); *G09B 15/04* (2013.01); *G09B 15/08* (2013.01)

(58) Field of Classification Search
CPC ......... G09B 15/00; G09B 15/04; G09G 15/08
See application file for complete search history.

(56) References Cited

U.S. PATENT DOCUMENTS

| 610,448 | A | * | 9/1898 | Illmer | 84/467 |
|---|---|---|---|---|---|
| 1,613,400 | A | * | 1/1927 | McAleavey | 84/477 R |
| 1,696,901 | A | * | 1/1929 | Bostelman, Jr. | 84/478 |
| 1,750,988 | A | * | 3/1930 | Bostelmann, Jr. | 84/478 |
| 2,807,183 | A | * | 9/1957 | Ney | 84/471 R |
| 2,983,053 | A | * | 5/1961 | Bartholomew et al. | 434/344 |
| 3,446,109 | A | * | 5/1969 | Scott et al. | 84/478 |
| 3,475,833 | A | * | 11/1969 | Andersen | 84/470 R |
| 3,478,159 | A | * | 11/1969 | Olson | 84/719 |
| 3,482,480 | A | * | 12/1969 | Decker | 84/478 |
| 3,610,086 | A | * | 10/1971 | Decker | 4/470 R |
| 3,695,138 | A | * | 10/1972 | Andersen | 84/470 R |
| 3,744,368 | A | * | 7/1973 | Lady | 84/470 R |
| 3,750,516 | A | * | 8/1973 | Olson | 84/470 R |
| 4,040,324 | A | * | 8/1977 | Green | 84/478 |
| 4,331,062 | A | * | 5/1982 | Rogers | 84/478 |
| 5,405,153 | A | * | 4/1995 | Hauck | 273/460 |
| 5,546,843 | A | * | 8/1996 | Degaard | 84/478 |
| 5,841,051 | A | * | 11/1998 | Segan | 84/477 R |
| 5,949,010 | A | * | 9/1999 | Hacker | 84/476 |
| 6,271,453 | B1 | * | 8/2001 | Hacker | 84/476 |
| 7,390,958 | B2 | * | 6/2008 | Knudsen | 84/645 |
| 7,667,119 | B1 | * | 2/2010 | Schlapkohl | 84/424 |

(Continued)

*Primary Examiner* — Robert W Horn

(57) ABSTRACT

With this invention to learn how to read music, neither the teacher nor student needs to have any knowledge of music at all. It is a box, divided into one section for the student and one for the teacher. Each side has a keyboard marked with music notes. There are 16 cards, eight for each clef marked with a music note and its staff position. Through a slot the teacher inserts one card a this time. The student can only see his/her side of the card, not the teacher's side which has the name of the note. The student identifies the note on his/her side of the card and pushes the note guessed key, then the teacher's keyboard lights up that note. If the student is correct or wrong the teacher pushes on a green or red light and then presses the correct key, playing the music note.

7 Claims, 3 Drawing Sheets

(56) References Cited

U.S. PATENT DOCUMENTS 8,008,563 B1* 8/2011 Hastings ................ 84/479 A
2012/0304847 A1* 12/2012 Hacker ................ 84/470 R
2014/0069260 A1* 3/2014 Galavis ................ 84/476

* cited by examiner

I CAN TEACH MUSIC

One embodiment of the present invention is a device for learning and teaching how to read music: The device consists of a box with two keyboard panels on each of the two opposite ends of the box: one keyboard panel for the student 2 and one keyboard panel for the teacher 1. The student's keyboard 2 has eight keys, each one marked with (DO-C) (RE-D) (MI-E) (FA-F) (SOL-G) (LA-A) (SI-B) (DO-C) musical notes above each key. The teacher's keyboard is identical to the student's keyboard, except that the corresponding audible notes are provided when each key is pressed. Each key on the student's keyboard activates a light on the teacher's keyboard 3 corresponding to its note when pressed.

The device has four windows, two on each opposite side: two for the student's, which correspond to the treble scale 4a and the bass scale 4b; and two for the teacher's, which correspond to the treble scale 5a and bass scale 5b. Each teacher's windows 5a and 5b also has one slot 9a and 9b into which the teacher can insert one of the instruction 16 cards (See FIG. 2). The student's windows 4a and 4b have a light 8a and 8b that is activated when a card is inserted into the slot 9a or 9b by the teacher.

The two teacher's windows 5a and 5b and the two student's windows 4a and 4b are separated by flat pieces marked with treble clef sign 6 and bass clef sign 7.

The teacher's side of the box has two compartments for storage, one for treble clef cards 10 and other for bass clef cards 11. These compartments hold eight cards each, treble clef cards 26 and bass clef cards 27. See FIG. 2.

Description of instruction cards, See FIGS. 2 and 3. All 16 cards are marked on one side only, and divided in two ends: the student's end 14 and 15 and the teacher's end 16 and 17. On eight of the cards (the treble cards 26), the student's end 14 is marked with one of each of the notes on the treble scale and its position on the staff; the student's end of the other eight cards 15 (the bass cards 27) is marked with one of each of the notes on the bass scale and its position on the staff. On eight of the cards (the treble cards 26), the teacher's end 16 is marked with one of each of the notes on treble scale and its position on the staff; the teacher's end 17 of the other eight cards (the bass cards 27) is marked with one of each of the notes on the bass scale and its position on the staff; however, the name of the note is also printed on the teacher's side.

All the cards are marked with an arrow (one direction 18) on the middle of the card. See FIG. 3 showing the direction the cards will be inserted in the teacher slot 9a or 9b. Also in the middle of the card, eight cards are marked with bass clef symbol 19 and eight cards are marked with treble clef symbol 20.

The device also has one red button 21 and one green button 22 on the teacher's side, and also one red button 23 and one green button 24 at the student's side. See FIG. 1.

The device also has a slope cover 25a and 25b over the teacher's windows to prevent the student from seeing the teacher's side of the instruction cards.

BACKGROUND OF THE INVENTION

The invention pertains to the music field, sub-group teaching. The invention is aimed for teaching and learning how to read music where two people are involved: the student and the teacher and can be any person, even with no knowledge at all about music. This invention overcomes barriers for any person without any musical knowledge to help others to learn how to read music. Applications are endless; a daycare instructor can teach kids of a very short age, parents or relative can help others willing to learn how to read music.

According to my knowledge and my research, every device aimed to teach music requires a musical knowledge from the instructor; the awesome property of my invention is that a person without any musical knowledge is able to teach and/or help another person to learn how to read music.

BRIEF DESCRIPTION OF THE DRAWINGS

FIG. 1 is a general description of the entire box with three views and its elements;

HOW IT WORKS

Figure 1A:
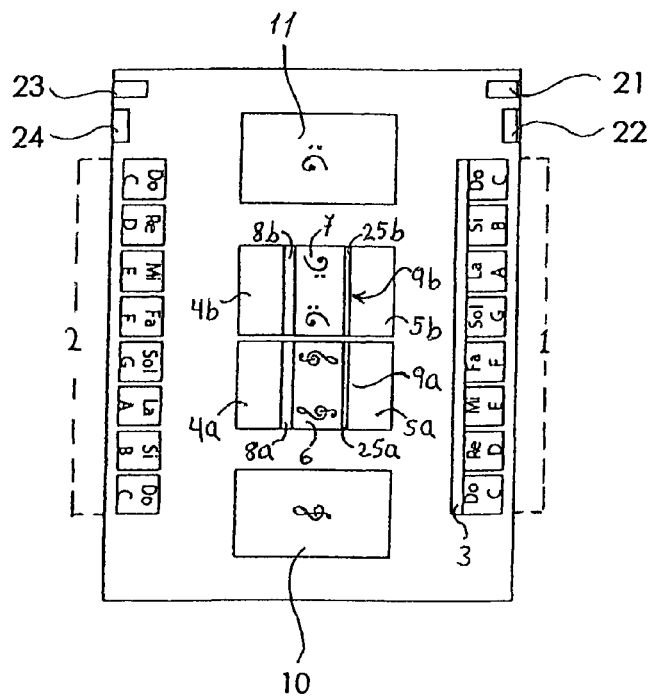
FIG. 1A shows a view from the top of the box.
Figure 1B:
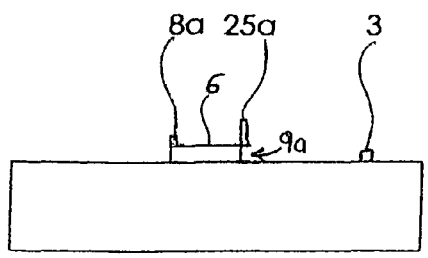
FIG. 1B shows a lateral view.
Figure 1C:
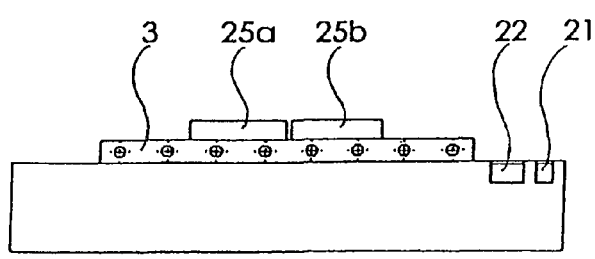
FIG. 1C shows a frontal view from the teacher side.
Figure 2:
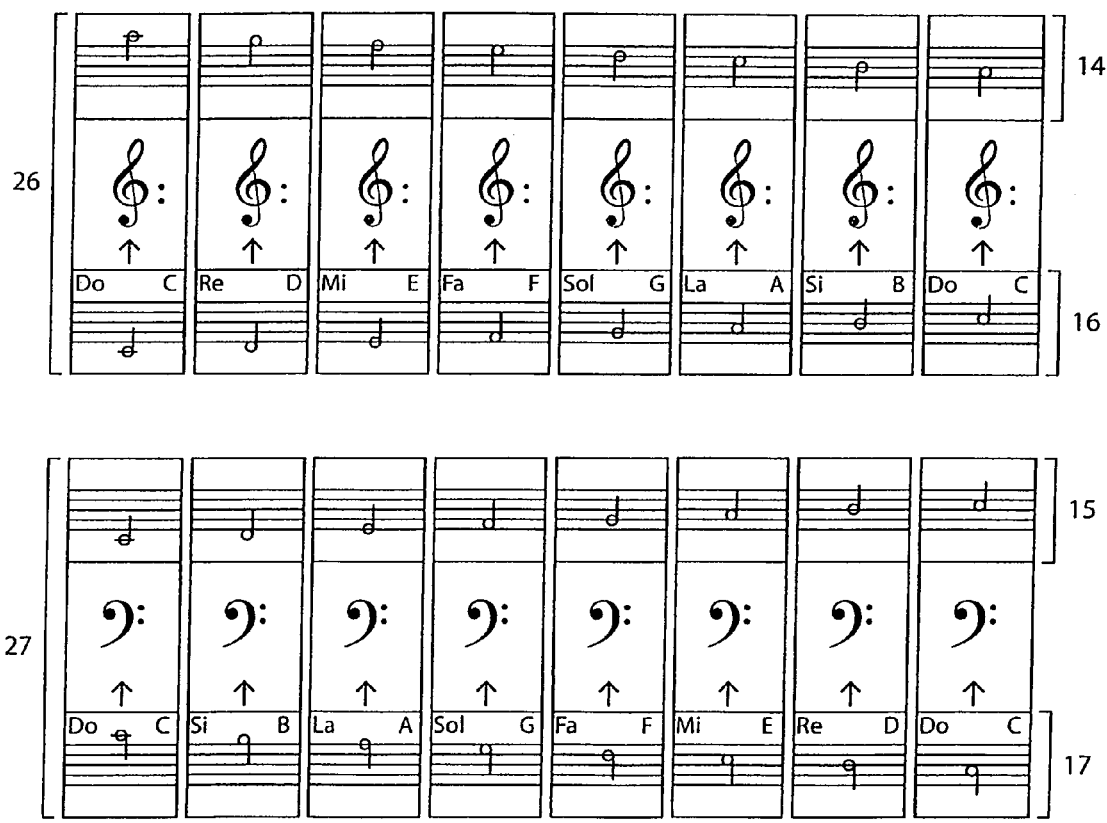
FIG. 2 is a general view of the 16 cards showing the student's and teacher's ends and their correspondent clef scale and bass scale.
Figure 3:
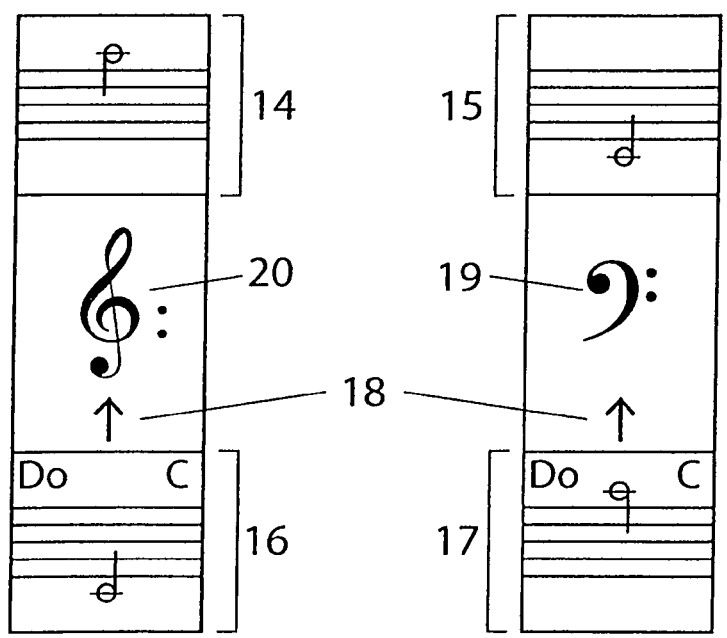
FIG. 3 is a closer and detailed view of each one of the cards with the note and their position on the staff belonging to clef scale and bass scale.

1. The teacher randomly selects only one card from the two groups (treble clef scale 26 or bass clef scale 27). The teacher inserts the card into his/her slot 9a or 9b in the direction the card is marked. The card becomes visible in the two windows at the same time 4a and 5a or 4b and 5b. When the selected treble or bass scale's card is inserted by the teacher in his/her slot 9a or 9b, a light on the student's window gets on (treble clef 8a or bass clef 8b). This light indicates to the student which scale is being requested.
2. The student reads and identifies on his/her window 4a or 4b the musical note. The student hits on his/her keyboard 2 the note guessed. The key hit by the student lights on the corresponding music note guessed on the teacher's keyboard 1.
3. The teacher can read on his/her window 5a or 5b the right name of the note that is written on his/her card and can compare with the note lit on his/her keyboard 1.
4. If the name of the note is correct (the same on the teacher's side card as on the teacher's keyboard light 3), then the teacher pushes the green button 22 to tell the student that his/her selection is correct, and the green button of the student's side gets on. If it is not correct, the teacher pushes the red button 21 to tell the student that the selection is wrong and then the student's red button 23 gets on.
5. After this, the teacher hits on his/her keyboard 1 the key corresponding to the card inserted to make the note sounds; this way the student becomes familiar with the sound of the note.

I claim:

1. A manually operable device for teaching and learning how to read music comprising:

a box with two keyboard panels in opposite sides, one keyboard panel for the student and one for the teacher;

the keyboard panels comprising eight keys marked with music notes on the top as follows (DO-C) (RE-D) (MI-E) (FA-F) (SOL-G) (LA-A) (SI-B) (DO-C);

the student's keyboard panel activating a light on the teacher's keyboard corresponding to its note when pressed, the teacher's side keyboard also including the corresponding audible note when each key is pressed;

the device comprising four windows, two on each opposite side: two for the student which correspond to the treble scale and bass scale and two for the teacher which correspond to the treble scale and bass scale, and two flat pieces separating the teacher's windows and the student's windows;

the device defining one slot between each teacher's window and each one of the flat pieces, and each of the student's windows comprising a light that is activated when one card is inserted in the slot by the teacher.

2. A manually operable device according to claim 1 wherein all the cards include an arrow on the middle of the cards showing the direction the card has to be inserted in the teacher's slot.

3. A manually operable device according to claim 1 wherein the device comprises one red button and one green button at the teacher's and the student's sides for indicating whether a selection is correct.

4. A manually operable device according to claim 1 including a slope cover over the teacher's windows.

5. A manually operable device for teaching and learning how to read music comprising:

a box with two keyboard panels in opposite sides, one keyboard panel for the student and one for the teacher including two decks of eight cards for a total of 16 cards which are only marked on one side;

all the cards have teacher's ends and student's ends;

eight student's cards ends are marked with the notes of treble clef scale and their position on the staff;

the other eight student's cards ends are marked with the notes of bass clef scale and their position on the staff;

eight teacher's cards ends are marked with the notes of treble clef scale and their position on the staff but also the name of the note is printed on them; and the other eight teacher's cards ends are marked with the notes of bass clef scale and their position on the staff but also the name of the notes is printed on them.

6. A manually operable device according to claim 5, the teacher side defining two compartments, one for treble clef scale and other for bass clef scale, each compartment containing eight cards.

7. A manually operable device according to claim 5, wherein all the cards include an arrow on the middle of the cards showing the direction the card has to be inserted in the teacher's slot.

* * * * *